United States Patent
Grajo et al.

(10) Patent No.: US 8,504,599 B1
(45) Date of Patent: Aug. 6, 2013

(54) INTELLIGENT SYSTEM FOR DATABASE RETRIEVAL

(75) Inventors: Eric Grajo, Dublin, OH (US); Gregg Dennis, Marysville, OH (US); Eric Moody, Delaware, OH (US); Gary Reiss, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1001 days.

(21) Appl. No.: 12/246,666

(22) Filed: Oct. 7, 2008

(51) Int. Cl.
*G06F 17/00* (2006.01)

(52) U.S. Cl.
USPC ........... 707/964; 704/953; 704/821; 704/790; 704/705; 704/608

(58) Field of Classification Search
USPC ................. 707/608, 687, 705, 790, 813, 821, 707/953, 964
See application file for complete search history.

(56) References Cited

U.S. PATENT DOCUMENTS

| | | | |
|---|---|---|---|
| 5,103,498 A | 4/1992 | Lanier et al. | |
| 5,806,057 A | 9/1998 | Gormley et al. | |
| 6,269,355 B1 | 7/2001 | Grimse et al. | |
| 6,377,965 B1 | 4/2002 | Hachamovitch et al. | |
| 6,405,159 B2 | 6/2002 | Bushey et al. | |
| 6,539,421 B1 | 3/2003 | Appelman et al. | |
| 6,636,836 B1 | 10/2003 | Pyo | |
| 6,745,184 B1 | 6/2004 | Choi et al. | |
| 7,007,235 B1 * | 2/2006 | Hussein et al. | 715/751 |
| 7,032,174 B2 | 4/2006 | Montero et al. | |
| 7,043,690 B1 | 5/2006 | Bates et al. | |
| 2002/0054095 A1 | 5/2002 | Asama et al. | |
| 2002/0095447 A1 | 7/2002 | Weber et al. | |
| 2003/0004802 A1 * | 1/2003 | Callegari | 705/14 |
| 2003/0055983 A1 * | 3/2003 | Callegari | 709/227 |
| 2003/0225720 A1 | 12/2003 | Farlow et al. | |

* cited by examiner

*Primary Examiner* — Sana Al Hashemi
(74) *Attorney, Agent, or Firm* — Rankin, Hill & Clark LLP

(57) ABSTRACT

An intelligent system for database retrieval includes a computing device, an input device, a display device, and a storage device. A user initiates a free-form or structured inquiry of the storage device and the system executes a search for the free-form or structured inquiry and additionally for related knowledge if a free-form inquiry was initiated. The related knowledge search is system initiated and based upon the sensory information of the user and the user's behaviors. The free-form or structured inquiry and related knowledge results are returned to the computing device for formatting in a manner compatible with the user, the user's behavior, and the operating environment. The free-form or structured inquiry and related knowledge results are then displayed on the display device.

18 Claims, 2 Drawing Sheets

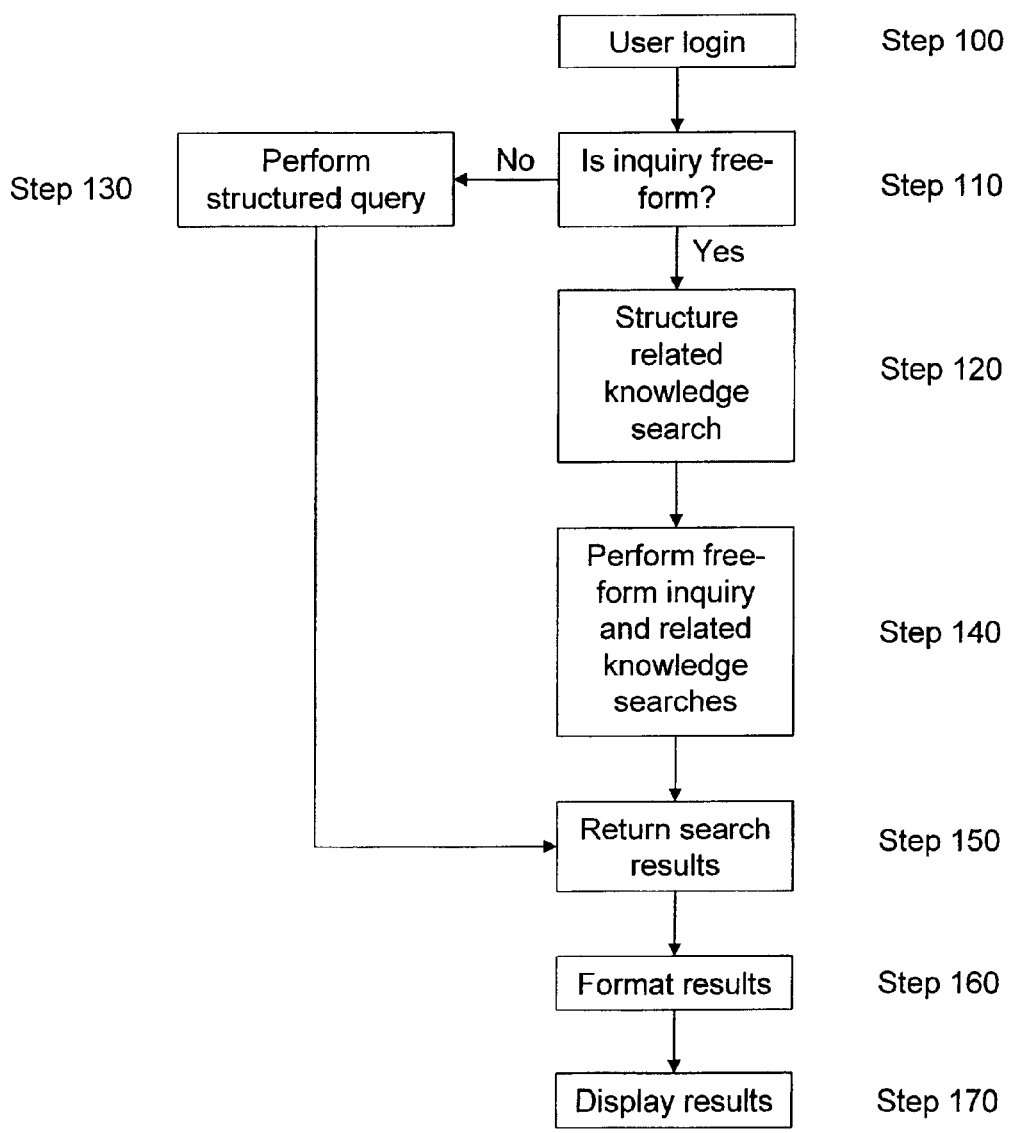

INTELLIGENT SYSTEM FOR DATABASE RETRIEVAL

BACKGROUND OF THE INVENTION

1. Field of the Invention

The present invention is directed toward a device and method for a knowledge based approach to data retrieval and presentation. This knowledge based approach includes a perception of users in all forms, such as using know-how, experience, intelligence or sensory information to recover and display the data.

2. Description of Related Art

As more and more organizations introduce computers into the everyday operations of their facilities, large amounts of data are collected. The computer users employ this data to make informed decisions. However, with this increased data, there is the issue of how to best search and present the data.

Initially as methods for data searching and presenting were being developed, businesses digitized their engineering drawings with computer aided drawing (CAD) systems. This allowed the drawings to be easily modified as changes occurred during the development of the product. Next, businesses focused on integrating the existing computer systems/storage devices for better data exchange between the respective systems. Additionally, product data management (PDM) software was created. The PDM software managed and tracked the creation/modification of all information related to the specific product. With the PDM software, relationships between sets of data that define the product are stored in the storage device and can be searched with structured queries. Later, with the development of the Internet, wide area network (WAN) access proliferated and server based systems were developed to further aid in data searching and presentation.

To effectively search the data that was being created, algorithmic search methods were devised. These conventional search methods were user initiated and allowed the user an initial way of locating data. However, the search methods required input by the user and only provided the exact data requested by the user. Furthermore, receiving useful data hinged on whether the user knew how to properly structure the search routine. As the search methods required the user to initiate the search, time and effort was expended by the user. Additionally, if the user was not skilled in using the search method, the search was unproductive and would not display the desired data.

The conventional search method has several characteristics. As mentioned hereinbefore, the search is user initiated. Furthermore, the conventional search is based on a deduction or hypothesis by the user. Typically, the conventional search method is either of an algorithmic search engine type (e.g. www.google.com or look-up queries), a historically generated checklist, or a relational database. The conventional search method does not allow the user to leverage the knowledge of other users in the business organization. Nor are the results from the conventional search method based upon the time or place when the search was initiated. Finally, the results from the conventional search method are typically generated as a list of items that are not formatted with regard to the user or the user's behavior.

Therefore, there exists a need in the art for an apparatus and method for a knowledge based search system for data retrieval and presentation that does not depend on the user's skill, a priori knowledge in searching, and/or solely on action by the user.

SUMMARY OF THE INVENTION

The present invention is directed toward an apparatus and method for a system of intelligent database retrieval. The system provides that a user is presented with data that is retrieved based upon a knowledge based approach.

More specifically, the present invention involves a computing device, an input device, a display device, and a storage device. The user may initiate a free-form or structured inquiry, where the free-form inquiry uses key words with Boolean operators and the structured inquiry may be particular identifying information, such as a product part number or a drawing number. If the user initiates the free form inquiry, the system performs a search for results to the free-form inquiry and the related knowledge.

The related knowledge is based on sensory information in the system, such as current user identity, other users with a similar purpose or intent, geographic location, affiliation, role/responsibility, business function, timing, and/or current/previous user behavior/actions. If the user initiates the structured inquiry, the system preferably only performs an inquiry for results to the structured inquiry. The results from the user initiated inquiries and system initiated search may be valuable for predictive and analytical uses.

Additionally, the results from the free-form and structured inquires and related knowledge search are presented to the user in a format suitable to the environment in which the user behavior or action of the user which initiated the inquiry or search took place.

BRIEF DESCRIPTION OF THE DRAWINGS

These and further features of the invention will be apparent with reference to the following description and drawings, wherein:

FIG. 2 is flowchart illustrating a method of intelligent database retrieval.

DETAILED DESCRIPTION OF THE PREFERRED EMBODIMENTS

Figure 1:
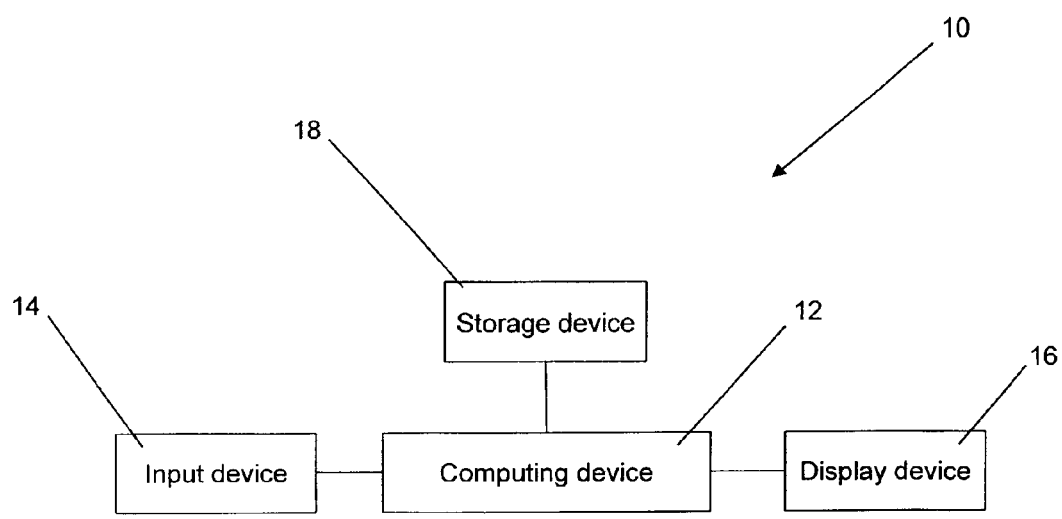
FIG. 1 is a schematic of an intelligent database retrieval system of the present invention.

With reference to FIG. 1, an intelligent system 10 for database retrieval according to the present invention is shown. The intelligent system 10 includes a computing device 12, an input device 14, a display device 16, and a storage device 18.

The computing device 12 is a machine that receives and processes information and data. The computing device 12 may be a stand-alone machine, such as a personal computer (PC) or alternatively, a network server. However, any type of computing device would be acceptable for the present invention. The computing device 12 can run a number of applications including commercial off the shelf software or custom analytical software. Additionally, the computing device 12 may be connected to the Internet (not shown).

The input device 14 may be a keyboard, a mouse, a trackball, or a combination of these devices. Additionally, the input device 14 may be any number of other commercially available devices that allow a user (not shown) to communicate with the computing device 12, such as barcode readers and touch-screen devices.

The display device 16 may be, for example, a cathode ray tube (CRT) device, a liquid crystal display (LCD) device, or a digital projector. Alternatively, the display device 16 may be a printer. However, any display device that allows for the presentation of information to the user is contemplated. Furthermore, it is noted that multiple input devices 14 and display devices 16 can be connected to the computing device 12 to allow users from the same or different locations to simultaneously use the computing device 12.

The storage device 18 holds data on rotating platters with magnetic surfaces. Typically, the storage device 18 is a commercially available hard drive and is a collection of records or data that is readable by the computing device 12. It is also envisioned that the data could alternatively be stored on other types of media, for example flash memory, CD-ROMs and DVDs. Furthermore, the storage device 18 may be situated in any number of locations. For example, the storage device 18 may be located next to the computing device 12 or may be at a location remote to the computing device 12.

As will be appreciated by those skilled in the art, the storage device 18 could be integral to the computing device 12. Furthermore, while FIG. 1 only shows one storage device 18, it is considered apparent that multiple storage devices 18 could be connected to the computing device 12. With this configuration, the computing device 12 can integrate data from numerous storage devices 18 for display on the display device 16. Therefore, the computing device 12 is designed to search across multiple display devices 16 or platforms at the same time, thereby eliminating the inconvenience of manually searching multiple platforms, as with the conventional search methods.

While the computing device 12, input device 14, display device 16, and storage device 18 are illustrated as separate components, it is contemplated that each of the items 12, 14, 16, 18 could be integrated into one device. Furthermore, while the components 12, 14, 16, 18 are shown as being connected by wires in FIG. 1, wireless technology (e.g. Wi-Fi or Bluetooth technology) to provide communication between the components 12, 14, 16, 18 is contemplated and possible.

With reference to FIG. 2, operation of the intelligent system 10 will now be discussed. First, the user enters login information into the intelligent system 10 with the input device 14 and the login information is transmitted to the computing device 12 (Step 100). Typically, the login information contains a username and password that is unique to the individual user. However, it is contemplated that only the username or the password may be required for login information. Alternatively, the login information may be provided by some type of biometric system or other commercially available authenticating system.

By entering the login information, sensory information such as criteria about the user is then known by the intelligent system 10. This sensory information about the user is known because it has been previously inputted into the intelligent system 10 and is stored in a lookup table in the storage device 18, as will be discussed hereinafter. After the computing device 12 receives the user's login information, the computing device 12 initiates a review of the lookup table in the storage device 18 for the sensory information associated with the specific login information for the user. Additionally, the computing device 12 initiates a review of the lookup table in the storage device 18 for the status of current project milestones for the products that may be searched, as will be discussed hereinbelow.

The sensory information preferably includes the user's assigned geographic location, business type, and role in the organization. For example, after the login information is entered, one part of the sensory information that is known is the user's assigned location, which is determined from review of the lookup table in the storage device 18. Specifically, the intelligent system 10 is aware of the user's assigned geographic location, such as whether the user is working in a North American, South American, European, or Asian location. Furthermore, with the login information, the user's assigned business location type, which may be for example, a manufacturing facility, a research and development center, or a corporate headquarters, is known. Also known from the login information is the user's role in the business. For example, the user may be a quality engineer, a manufacturing engineer, a design engineer, an accountant, or a sourcing agent. Alternatively, the user may not be an employee of the business, but rather a supplier or customer of the business.

Additionally, the date and/or time of when the login information was provided to the intelligent system 10 is captured. By knowing when the user logged onto the intelligent system 10, the intelligent system 10 can better tailor the related knowledge search to yield pertinent results, as will be discussed below. Product lifecycle management (PLM) is the process of managing the lifecycle of a product during the phases of conception, design, manufacture, product redesigns, and discontinuation of the product. The phase of discontinuation may include how to recycle the product when the product has reached the end of its designed life and how to deal with customer inquiries regarding replacement parts or products. As is known to one skilled in the art, during the lifecycle of the product, there are various milestones (e.g. end of a stage that marks the completion of a phase) that occur. During each of these milestones, the information deemed desirable to be known by the user may change.

For example, during the design phase when a free-form inquiry is performed, it would be desirable for the user to be informed of quality related defects of similar products, so that new products could be designed so as to minimize the occurrence of the known defect. As mentioned hereinbefore, the computing device 12 initiates a review of the lookup table in the storage device 18 for the status of current project milestones for all products. It is noted that the product need not be assigned to the individual user for the milestone review to occur. Accordingly, the intelligent system 10 tailors the related knowledge search and search results based upon the status of the product in the product lifecycle.

Knowing the user's role in the organization is helpful in structuring the related knowledge search, as will be discussed hereinafter. Typically, different users would be interested in different information. For example, the quality engineer may be focused on reducing material defects, while the manufacturing engineer may be concerned with eliminating ergonomic injuries in the manufacturing facility. Further still, the design engineer may be investigating the possibility of making material changes to more eco-friendly materials and the accountant may be focused on tracking raw material costs for the manufacturing facility. The sourcing agent may be interested in understanding if a product is used across multiple platforms to maximize purchasing power with vendors. The supplier or customer of the business would have different interests that would be unique to their circumstances. It is understood that any of the roles may have limited access to the storage device 18.

After login, the user may enter an inquiry with the input device 14 (Step 110). It is noted that the intelligent system 10 maintains a log of past inquiries to create an audit trail. This audit trail is useful for allowing the re-creation of inquiries and also so that the intelligent system 10 may better structure the related knowledge search as will be discussed below.

The inquiry may be the structured inquiry or the free-form inquiry. For example, the structured inquiry from the quality engineer user may be a request for engineering drawings of a front bumper mount. With the present example, the structured inquiry would occur by the quality engineer entering the part number of the front bumper mount with the input device 14 into the computing device 12. Alternatively, with the free-form inquiry, the quality engineer would enter "front and bumper and mount and warranty" with the input device 14 to initiate the inquiry to search for warranty data for front bumper mounts. Based on the sensory information in the intelligent system 10, such as current user identity, other users with a similar purpose or intent, geographic location, affiliation, role/responsibility, business function, timing, and/or current/previous user behavior/actions, the intelligent system 10 performs a system initiated search of the storage device 18 for related knowledge when the free-form inquiry is initiated. As compared to the conventional search methods, the intelligent system 10 will search across multiple storage devices 18 when the free-form inquiry is initiated.

Based upon the sensory information associated with the user's login information, the user's current/previous behaviors stored in the storage device 18, and the subject matter of the inquiry and date/time of login, the intelligent system 10 structures the system initiated related knowledge search (Step 120). Furthermore, the intelligent system 10 may exhibit cascading behavior. In particular, the intelligent system 10 can adapt the structure of the related knowledge search based upon previous free-form inquiries and follow-up free-form inquiries, thereby resulting in a system that adjusts based upon follow-up questions by the user so as to anticipate what the user truly means to ask. This is accomplished through pattern matching of the inquiry and the user's response.

Alternatively, if the user has initiated the structured inquiry, the intelligent system 10 only performs an inquiry of the storage device 18 for results to the structured inquiry (Step 130).

As mentioned hereinbefore, the sensory information includes the user's assigned geographic location, business type, and role in the organization. As is considered apparent, other sensory information about the user could also be used to structure the system initiated related knowledge search. For example, sensory information could include the current projects on which the user is currently working on for the business entity. If the user is working on safety or cost reduction projects, the related knowledge search would be structured with a focus on those topics. Alternatively, if the user was working on a fuel-saving or environmental project, the related knowledge search could be slanted toward that direction. Thus, the sensory information is utilized to structure the system initiated related knowledge search so as to limit the search to data that would be helpful to the user.

The user's current/previous behavior encompasses numerous actions by the user. Additionally, these current/previous behaviors are stored in the storage device 18 and are accessed by the computing device 12 after the user enters the free-form inquiry with the input device 14. The user's current behaviors may include current deployment of tool functions/features by the user in the intelligent system 10, assistance requests of the intelligent system 10 by the user, and also tasks or workflow in process by the user. The previous behaviors may include the order in which the user previously accessed information, the type of information that the user had previously accessed, and the format in which the user viewed the previously accessed information. The previous behaviors may further include the prior inquiries, prior results from the inquiries, and follow up inquiries. The current/previous behaviors are used to structure the system initiated search so as to search for data that would most likely be desired by a user that has a history of searching for certain types of data, thereby preventing data that would not be relevant to the user from being searched. Furthermore, other user's behavior can also be used to structure the related knowledge search, thereby leveraging the collective know-how of the organization.

With regard to the user's previous behaviors, if the quality engineer previously searched for cost information for the product after requesting a Change Request in the free-form inquiry, the intelligent system 10 would conduct a free-form inquiry for the Change Request and also structure a related knowledge search for the cost information for the product.

The subject matter of the free-form inquiry is also used to structure the system initiated related knowledge search since the related knowledge search is based on systematized mining of data in the storage device 18 for information associated with the product. For example, there may be important safety information about the product that the business decides should be broadcast to all users who have a free-form inquiry about the product. Thus, all users would be informed of the important message regardless of their specific free-form inquiry about the product. While the present invention has been described with regard to searching for information related to a product where the product is some tangible object, it is considered apparent that the product could instead be in a non-tangible form, such as a process, material, or a design.

Alternatively, the related knowledge search based upon the free-form inquiry may be for pertinent ergonomic injury notices from processes associated with manufacturing of the product. Additionally, equipment/tool constraints and tolerance analysis results from previous products may be searched along with the inquiry. Further also, the related knowledge search may be for applicable packaging requirements, logistics costs, and supplier information that could be related to the free-form inquiry. Additionally, it is envisioned that the related knowledge search could be for a plurality of items. By utilizing the subject matter of the free-form inquiry when structuring the related knowledge system initiated search, data deemed pertinent to the product is reviewed.

After structuring the related knowledge search, the intelligent system 10 would then perform an inquiry of the storage device 18 for results to the free-form inquiry and also for the related knowledge (Step 140). The related knowledge would be associated with the free-form inquiry, but not the same. As mentioned hereinbefore, the related knowledge search is based upon sensory information about the user, current/previous behavior of the user, and the free-form inquiry. Furthermore, the related knowledge search may be based upon a different user's inquiry where the different user had a similar purpose or intent, geographic location, affiliation, role/responsibility, business function, timing, and/or current/previous behavior/action as the current user.

The results from the free-form or structured inquiry and the related knowledge search of the storage device 18 are then returned to the computing device 12 for processing that may include predictive and analytical processing (Step 150). With this predictive and analytical processing, the intelligent system 10 delivers statistical analysis based upon historical data and performs statistical forecasting and regression analysis. This data is used as a future input for related knowledge searches, thereby resulting in meaningful output to the user. For example, when processing the results from the free-form inquiry, the intelligent system 10 may notice that the data indicates that there is an increase in warranty costs for a specific product, as compared to a standard baseline. The intelligent system 10 would then ask the user if more analysis should be performed, thereby flagging the results as needing extra attention by the user.

In the example of the quality engineer user requesting information about the front bumper mount, the intelligent system 10 would also return the Change Requests for the mount and also warranty issues for related products, processes, or designs as mentioned hereinbefore. The results from the user initiated inquiry and system initiated search are valuable for predictive and analytical uses.

Then, the free-form and structured inquiry results and related knowledge search results are formatted by the computing device 12 (Step 160). The results of the free-form and structured inquiries and related knowledge search are formatted based upon, for example, the data retrieval method, the original classification and organization of the data, the current deployment of tool functions/features of the user, the creation of certain system objects by the user, the user's identity based upon provided log-in information, assistance requests by the user, or task or workflow completion by the user.

It is noted that the related knowledge search can be pushed or pulled to the user based upon the user's behavior as a recognition based model and does not require a user initiated inquiry to initiate the related knowledge search. For example, the computing device 12 can operate in the background of the intelligent system 10 while a user is drawing a part in a CAD program. By monitoring the user's drawing actions, the computing device 12 can recognize the part that the user is attempting to draw by analyzing the part shape before the drawing is completed. Thus, the computing device 12 can either automatically finish drawing the part or provide related knowledge for the part without a request by the user. For example, if the user started drawing a side view mirror, the intelligent system 10 would recognize the shapes being drawn as a side view mirror. Then, the intelligent system 10 could either automatically complete the drawing of the side view mirror for the user or return related knowledge regarding the side view mirror. For example, the intelligent system 10 could display Change Requests and warranty information about side view mirrors that are present in the storage device 18.

Furthermore, the present invention presents the user the results of the free-form or structured inquiry and also the related knowledge in the same or suitable format for the environment in which the user behavior or action that led to the search being initiated, also known as a native environment. In other words, the results from the free-form or structured inquiry and related knowledge searches are computer system neutral. After the results of the free-form or structured inquiry and related knowledge search are formatted, they are displayed on the display device 16 (Step 170). As mentioned hereinbefore, this could be on an LCD monitor or printed on paper and is based on the environment in which the user can support.

As compared to the conventional method of searching, the present invention offers numerous advantages. With the conventional method of searching, the search is user initiated and based on 'a priori' information. Additionally, as mentioned hereinbefore, the conventional search is either an algorithmic search method (e.g. www.google.com, look-up functions, queries), a historically generated checklist, or from a relational database. Therefore, the conventional search results are generated as a report that is merely a list of items. The conventional search results are also not formatted with regard to the user or the user behavior.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A method for intelligent database retrieval, comprising the steps of:
providing a system comprised of a storage device, an input device, a computing device, and a display device that is operated by a user for conducting at least one of a user initiated free-form inquiry and a user initiated structured inquiry;
logging into the system with the input device;
entering the free-form inquiry by the user;
structuring a search for related knowledge initiated by the system that is based upon sensory information, the sensory information including the free-form inquiry, prior inquiries by the user, and also the user's role within an organization, wherein the search for related knowledge is not the same as the free-form inquiry;
searching the storage device for results to the free-form inquiry and the related knowledge;
returning the results of the free-form inquiry and the related knowledge search to the computing device;
formatting the results of the free-form inquiry and the related knowledge search with the computing device;
displaying the formatted results on the display device; and
adapting the search structure for related knowledge based upon follow-up free-form inquiries.

2. A method for a system initiated database retrieval, wherein the system comprises a computing device, an input device, a storage device and a display device, the method comprising:
identifying a user behavior, wherein the user behavior is a free-form inquiry associated with a product and entered by a user with the input device;
determining a lifecycle status of the product based upon the user and current date and time information;
structuring a search for related knowledge associated with the free-form inquiry initiated by the system that is based upon sensory information associated with the user, the sensory information comprising the lifecycle status, the free-form inquiry, prior inquiries by the user, the user's role within an organization and previously accessed information by the user, wherein the search for related knowledge is not the same as the free-form inquiry;
executing a search on the storage device for the free-form inquiry and the search for related knowledge associated with the free-form inquiry;
returning the results of the search for the free-form inquiry and the search for related knowledge associated with the free-form inquiry to the computing device;
formatting the results based on the user behavior; and
displaying the formatted results on the display device.

3. A method for intelligent database retrieval, comprising the steps of:
providing a system comprised of a storage device, an input device, a computing device, and a display device that is operated by a user for conducting at least one of a user initiated free-form inquiry and a user initiated structured inquiry;
logging into the system with the input device;
entering the free-form inquiry by the user, wherein the free-form inquiry is associated with a product, process, material or design;
structuring a search for related knowledge by the system that is based upon sensory information, the sensory information including the free-form inquiry, previous free-form inquiries by the user, follow-up free-form inquiries and the user's role within an organization;

searching the storage device for results to the free-form inquiry and the related knowledge;

returning the results of the free-form inquiry and the related knowledge search to the computing device;

formatting the results of the free-form inquiry and the related knowledge search with the computing device; and displaying the formatted results on the display device.

4. The method for intelligent database retrieval of claim 1, wherein the step of structuring the related knowledge search is based upon a past behavior of the user.

5. The method for intelligent database retrieval of claim 1, wherein the step of structuring the related knowledge search is based upon sensory information associated with a different user.

6. The method for intelligent database retrieval of claim 1, wherein the step of formatting is based upon an existing operating environment of the system.

7. The method for intelligent database retrieval of claim 1, wherein the step of structuring the related knowledge search is based upon a current behavior of the user, wherein the current behavior is a current deployment of a software application tool function in the system by the user.

8. The method for intelligent database retrieval of claim 1, wherein the step of logging into the system limits access of the storage device by the user and is based upon a role of the user.

9. The method for intelligent database retrieval of claim 1, further comprising:

basing the free-form inquiry upon a product;

capturing date and time information when the user logs onto the system; and determining lifecycle status of the product based upon the captured date and time information.

10. The method for intelligent database retrieval of claim 1, the sensory information including business affiliation of the user.

11. The method for intelligent database retrieval of claim 1, wherein the prior inquiries by the user are retrieved from a lookup table containing information previously accessed by the user.

12. The method of claim 2, wherein structuring a search for related knowledge associated with the free-form inquiry is based upon sensory information associated with a different user, wherein the sensory information associated with the different user is similar to the sensory information associated with the user.

13. The method of claim 3, wherein structuring the related knowledge search and formatting the results is based upon current deployments of software application tool functions in the system by the user.

14. The method for intelligent database retrieval of claim 5, wherein the step of structuring the related knowledge search is based upon a past behavior of a different user.

15. The method for intelligent database retrieval of claim 7, wherein the results of the free-form inquiry and the related knowledge search are formatted based upon the current behavior.

16. The method for intelligent database retrieval of claim 7, wherein the current behavior of the user is computer aided drawing of an object, and wherein the related knowledge is based upon the object being drawn.

17. The method for intelligent database retrieval of claim 9, the sensory information including the lifecycle status of the product.

18. The method for intelligent database retrieval of claim 16, the related knowledge being warranty information for the object.

\* \* \* \* \*